UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AURIN DYE.

978,802.  Specification of Letters Patent.  Patented Dec. 13, 1910.

No Drawing. Original application filed April 27, 1910, Serial No. 557,950. Divided and this application filed August 12, 1910. Serial No. 576,837.

*To all whom it may concern:*

Be it known that I, MAX WEILER, doctor of philosophy, chemist, citizen of the German Empire, residing at Elberfeld, Germany, have invented new and useful Improvements in New Dyes, of which the following is a specification.

This application which is a divisional application of my application Serial No. 557950 relates to the production of a new dyesuff of the aurin series, which is obtained by condensing in the presence of oxidizing agents methylene-di-ortho-cresotinic acid with para-cresotinic acid.

The new dye is a red powder soluble in dilute caustic soda lye with a red-violet color, dyeing wool from acid baths a violet shade after chroming on the fiber.

In order to illustrate the new process more fully the following example is given, the parts being by weight:—95 parts of methylene-di-ortho-cresotinic acid and 50.5 parts of para-cresotinic acid are stirred at from 20 to 45° C. together with 1500 parts of a strong sulfuric acid and the necessary quantity of nitrosyl sulfuric acid until the quantity of the dyestuff produced does no longer increase and the evolution of nitrogen oxids ceases. The product of the reaction is poured on ice and the dyestuff is filtered off.

I claim:—

The herein described new dyestuff obtainable from methylene-di-ortho-cresotinic acid and para-cresotinic acid which is a red powder soluble in caustic soda lye with a red-violet color, dyeing wool violet shades after chroming, substantially as described.

In testimony whereof I have hereunto set my hand in the presence of two subscribing witnesses.

MAX WEILER. [L. S.]

Witnesses:
CHAS. J. WRIGHT,
ALFRED HENKEL.